United States Patent [19]

Karlsson

[11] 4,226,387
[45] Oct. 7, 1980

[54] MULTIPLYING FISHING REEL WITH LEVEL-WIND CARRIAGE

[75] Inventor: Jarding U. Karlsson, Svängsta, Sweden

[73] Assignee: ABU Aktiebolag, Sweden

[21] Appl. No.: 961,904

[22] Filed: Nov. 20, 1978

[30] Foreign Application Priority Data

Nov. 28, 1977 [SE] Sweden .............................. 7713419

[51] Int. Cl.³ ...................... A01K 89/02; A01K 89/04
[52] U.S. Cl. .................................................. 242/212
[58] Field of Search ................ 242/84.42, 84.41, 84.4, 242/84.43, 211, 212, 213, 214, 215, 216, 217, 218, 219, 220, 221

[56] References Cited

U.S. PATENT DOCUMENTS

| 1,212,288 | 1/1917 | Upton | 242/84.42 |
| 1,345,702 | 6/1920 | Case | 242/84.42 X |
| 2,380,670 | 7/1945 | Nelson | 242/84.42 |
| 2,463,108 | 3/1949 | Jacobson | 242/216 |
| 2,859,924 | 11/1958 | Sarah | 242/212 X |
| 3,111,287 | 11/1963 | Baenziger | 242/84.42 |
| 3,429,521 | 2/1969 | Jones | 242/220 |

*Primary Examiner*—Billy S. Taylor
*Attorney, Agent, or Firm*—Karl W. Flocks

[57] ABSTRACT

The invention relates to multiplier fishing reels of the type having a line spool which is rotatable by means of a hand crank and a gear transmission for winding the fishing line onto the line spool and for driving a level-wind mechanism for uniformly laying the line over the line spool. The level-wind mechanism comprises a level-wind constructed to be automatically moved to an operative line-laying position and to capture the line when the line spool is driven by the crank after a completed cast and to be automatically pivoted to a free position in relation to the line during a cast.

1 Claim, 7 Drawing Figures

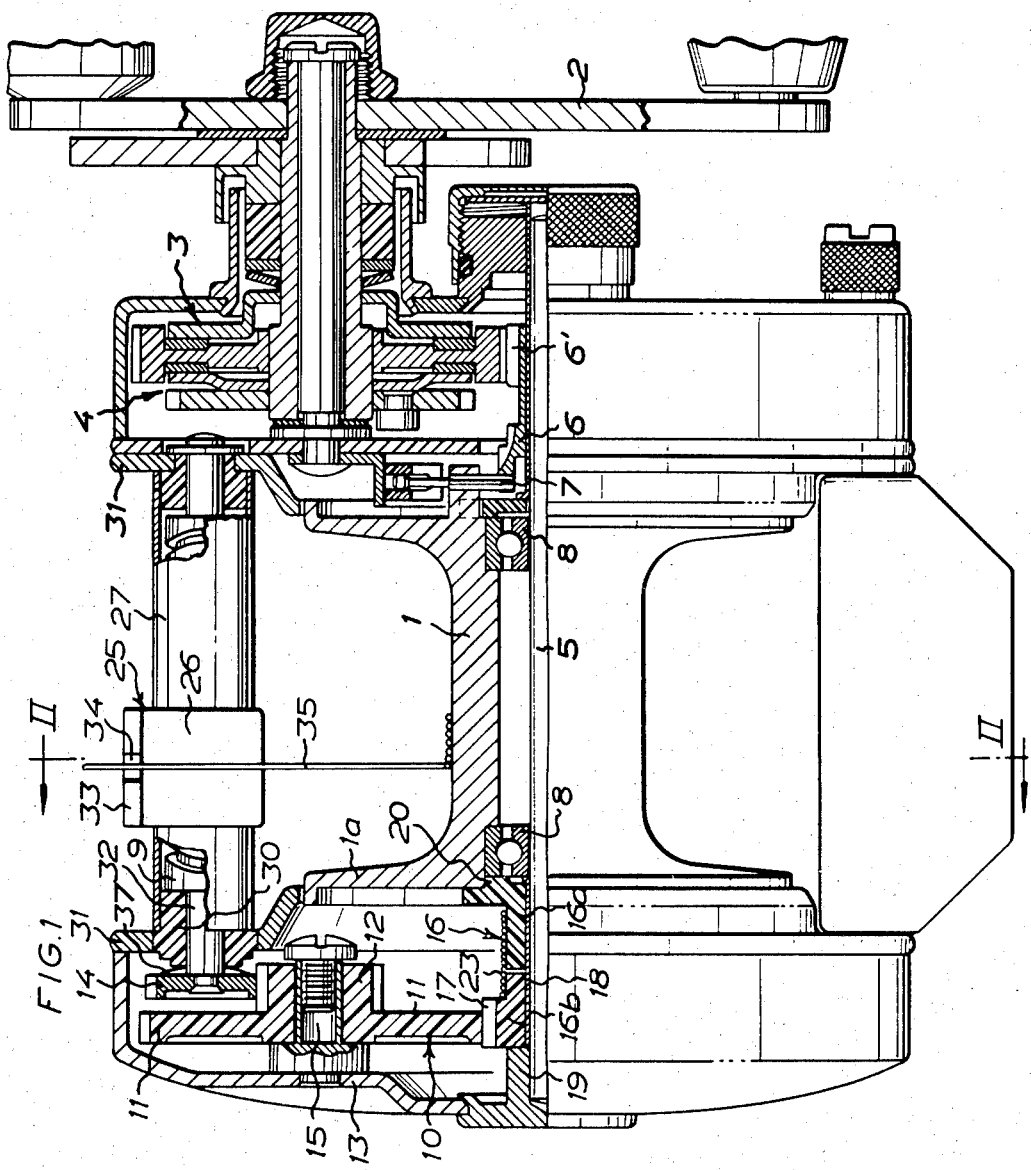

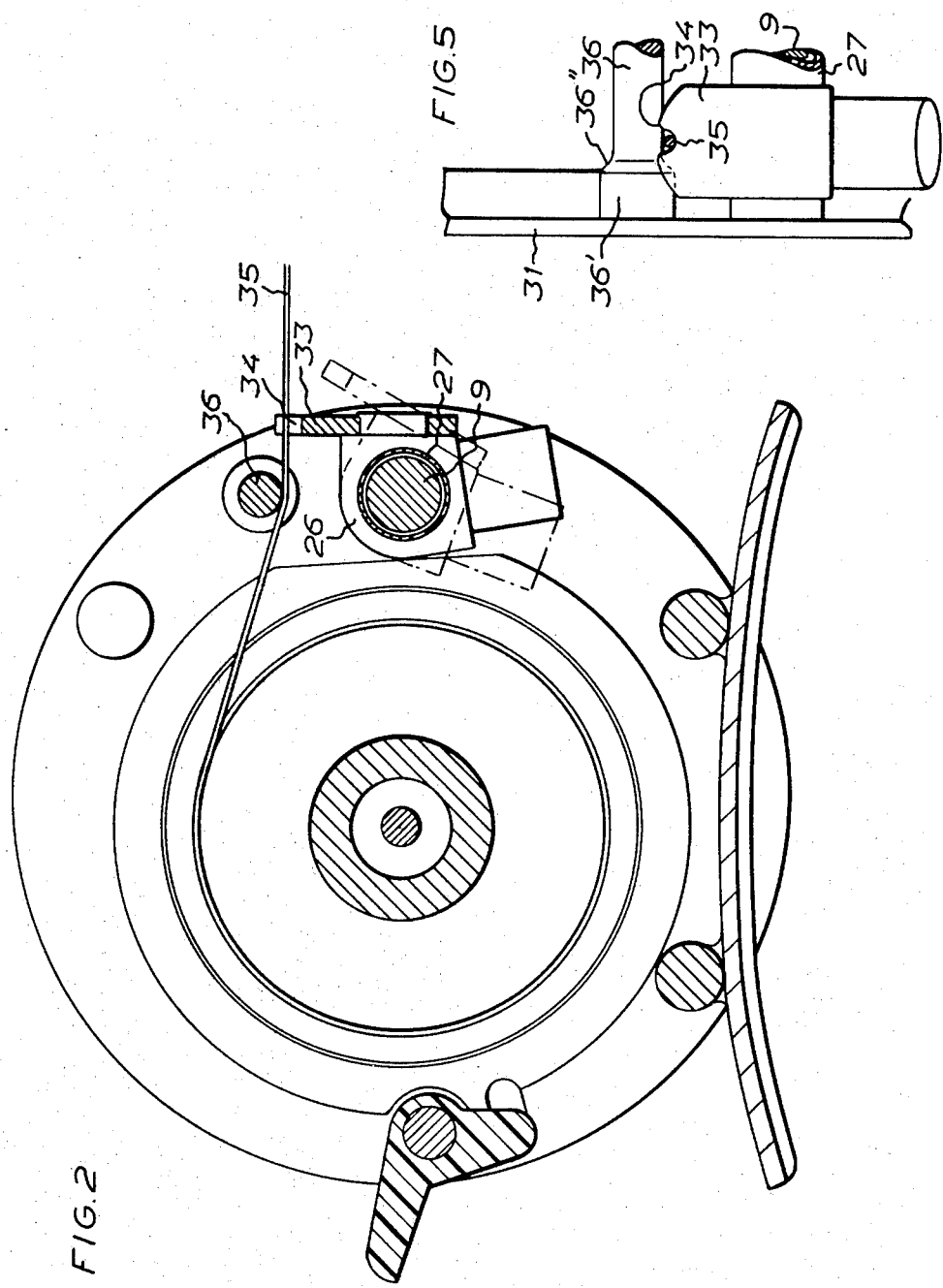

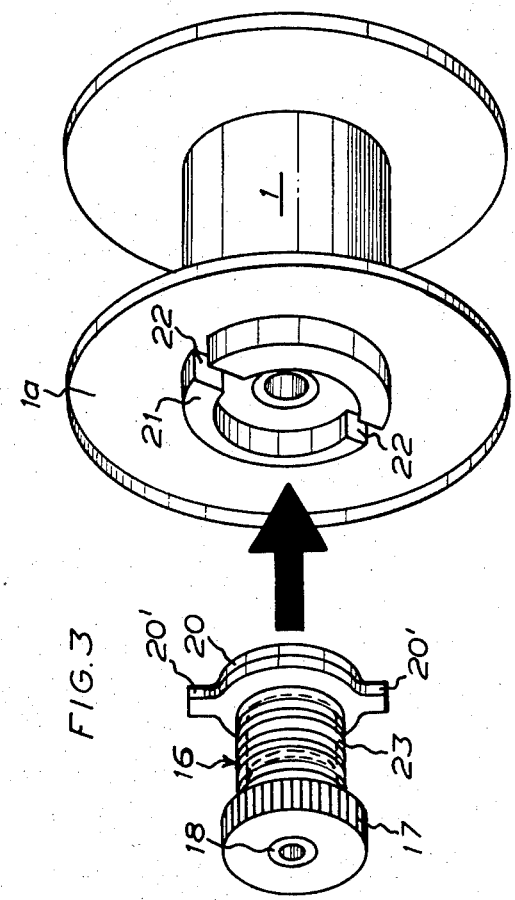

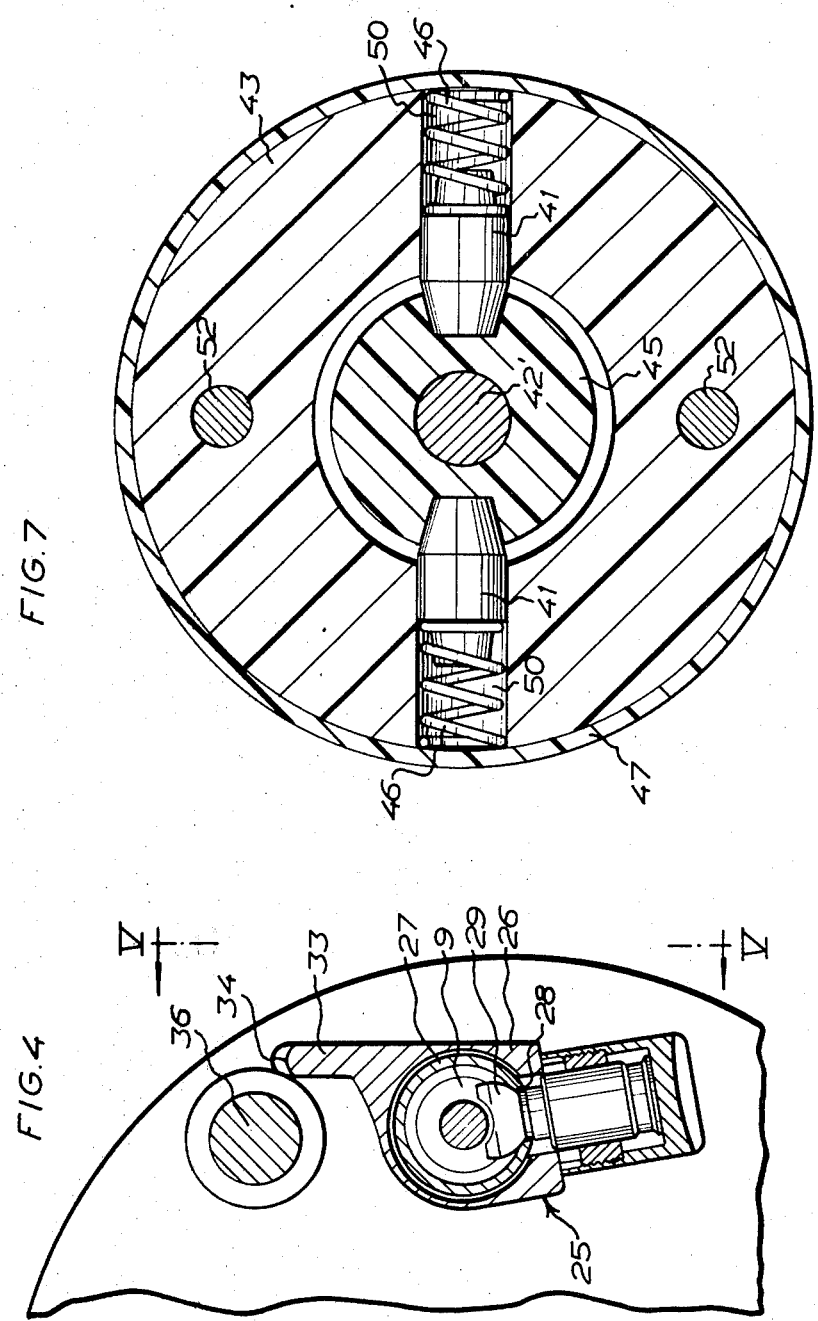

MULTIPLYING FISHING REEL WITH LEVEL-WIND CARRIAGE

The present invention relates to a multiplying fishing reel with a line spool operated by a crank and a level-wind mechanism driven by the crank, by the intermediary of the line spool and a transmission, the level-wind mechanism including a carriage driven by an involute screw and having a carriage pawl.

It is known in the art to equip multipliers with a mechanically acting device for release of the spool from the crank mechanism in order to make for greater casting lengths. It is also known, for the same purpose, to provide multipliers with a device for mechanical release of the level-wind such that this is motionless during the cast. However, these prior art constructions for release of the level-wind are mechanically complicated and sensitive and have not, as a result, come into general use, tending rather to disappear from the market.

The major aspect of the present invention is to provide, in a multiplier with a level-wind mechanism, a relatively simple, functionally reliable device for automatic release of the level-wind. A further aspect is to combine this device with a level-wind mechanism which allows of automatic release of the line from the level-wind during cast and automatic line pick-up on retrieval of the line.

According to the invention, the level-wind displays an open guide groove for the line and is, together with the carriage, pivotally disposed with respect to the involute screw between a first position which is free with respect to the line and a second position which is an operative level-wind position, the carriage being disposed, when the line is cast out, to be pivoted to the first position by the tractive force from the line or by inertia forces and to be returned to the first position by a torque produced by friction in the transmission for operation of the level-wind, for example between the involute screw and a clutch member, between the level-wind carriage and the involute screw, or between the involute screw and a drive means therefor and a rotatably journalled guide for the carriage.

The nature of the present invention and its aspects will be more readily understood from the following brief description of the accompanying drawings, and discussion relating thereto.

In the accompanying drawings:

FIG. 1 shows a preferred embodiment of a multiplier according to the invention, half of the figure being in side elevation and the other in axial section;

FIG. 2 is a section through the multiplier taken along the line II—II in FIG. 1;

FIG. 3 is a perspective view of the line spool seen from the left in FIG. 1 and shows the release mechanism for the level-wind in position for assembly with the line spool;

FIG. 4 shows details of the level-wind of FIG. 2 or of the section IV—IV in FIG. 6 on a larger scale;

FIG. 5 shows the arrangement of the level-wind in FIG. 4 seen in the direction indicated by means of arrows V—V in FIG. 4;

FIG. 7 is a cross-section of the centrifugal clutch taken along the line VII—VII in FIG. 6.

Figure 6:
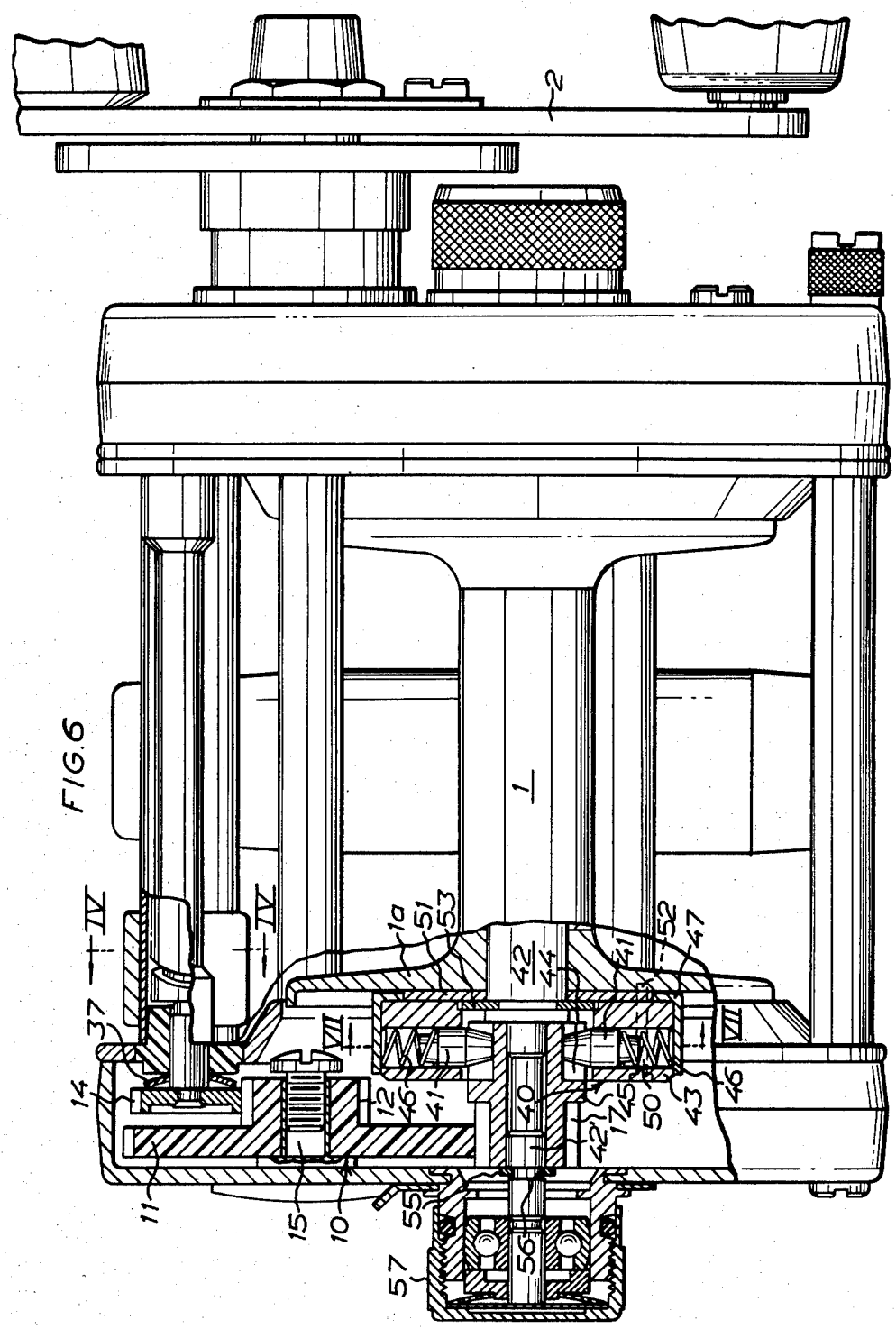
FIG. 6 is a side elevation and partial axial section of a modified embodiment of a multiplier according to the present invention.

The multiplier shown in FIG. 1 is of known basic construction in which the line spool 1 is driven by means of the crank 2 by the intermediary of a transmission which comprises a sliding clutch and gears which are generally designated 3 and 4, respectively, and a clutch 6 which is shiftably guided on the shaft 5 of the line spool 1, this shaft being axially adjustable but otherwise fixed. The clutch 6 is designed integrally with a gear wheel 6' and is shiftable by means of a clutch mechanism in a direction to the right with respect to FIG. 1 for release of the clutch 6 from a clutch portion 7 on the right-hand end wall of the line spool 1, and thus, for release of the line spool from the crank transmission. During the shifting movement of the clutch 6, the gear wheel 6' retains its engagement with a gear wheel which is included in the crank transmission and in relation to which the gear wheel 6' is shiftable.

In a well-known multiplier construction, the involute screw 9 of the level-wind is driven by the line spool 1 by the intermediary of a gear consisting of a gear drive mounted on the left end wall 1a of the line spool 1 (or the end wall of the line spool most distal from the crank) and driving, via an intermediate gear wheel, a small gear wheel 14 on the left-hand end of the involute screw 9. The embodiment shown in FIG. 1 belongs to this major category of multipliers but has, according to the invention, an automatically-operating release mechanism in the transmission between the line spool and the level-wind.

The intermediate gear wheel set which, in FIG. 1, is generally designated 10, may in a known manner be in the form of a unit which consists of one larger and one smaller gear wheel, 11 and 12, respectively, and is journalled on a cantilevered shaft 15 mounted on the left-hand outer end wall housing 13 of the multiplier. The smaller gear wheel 12 engages with the gear wheel 14 fixed to the left-hand end of the involute screw 9.

In the embodiment shown in FIG. 1, line spool 1 is operative to drive the intermediate gear set 10 by the intermediary of a clutch, generally designated 16, which comprises two clutch portions 16a, 16b, of which the one clutch portion 16b supports a gear drive 17 which is in mesh with the large gear wheel 11 of the gear set 10.

Both of the clutch portions 16a, 16b consist of two sleeves which are journalled on a slide bearing bushing 18 fixedly disposed on the one spool shaft 5. This bushing is, at the same time, in the form of a spacer sleeve between the inner ring, fixedly connected to the non-rotary spool shaft 5, of adjacent ball bearings 8 for journalling the spool 1 on the shaft 5, and the end of a sleeve 19 connected to the end wall housing 13, in which sleeve the end of the spool shaft 5 is inserted.

As is shown in FIG. 3, the one clutch portion 16a has a radial end flange 20 with two radial, diametrically opposed projections 20'. The left-hand end wall 1a of the line spool 1 has an annular, axial projection 21 which displays two recesses 22. The flange 20 and flange projections 20' of the clutch portion 16a may, on assembly, easily be inserted into the ring 21 on the spool flange 1a so that the flange projections 20' are brought into engagement with the recesses 22 (please see FIG. 1).

A helicoidal, preferably flat, clutch spring 23 is disposed on each clutch portion 16a, 16b, the spring resting with slight friction against the outer peripheral surfaces of the two clutch portions 16a, 16b. This arrangement forms a per se known one-way clutch which, on rotation of the line spool 1 by means of the crank 2, drives the level-wind by the intermediary of the gear wheels 17, 11, 12, 14. When the crank is turned in the direction intended for retrieval of the line, the spring 23 is immediately tightened about and couples the portions 16 and 16a and the arrangement realizes automatic release of the clutch portion 16a from the clutch portion 16b (and thus from the level-wind transmission) when the line spool is rotated by the tractive force from the line during a cast.

Thus, during a cast, the entire transmission for the level-wind mechanism, counted from the clutch portion 16b, is immediately released whereby the line spool will, during the cast, run as freely as possible and, when the crank is used for retrieval of the line after a cast, the level-wind is immediately reengaged as the clutch spring 23 is tightened.

The level-wind according to the invention, generally designated 25, comprises, in a conventional manner, a carriage 26 (please see, in particular FIGS. 2 and 4) which, for reciprocal movement in the axial direction of the involute screw 9, is shiftably guided on a guide tube 27 which surrounds the involute screw 9 but has an axial slot 28 (please see FIG. 4) through which a coupling pin 29 supported on the carriage extends to the involute screw with whose thread the wedge-shaped end of the pin engages. On retrieval of the line by means of the crank 2, the involute screw 9 is rotated by the intermediary of the above-described transmission and reciprocally drives, in a per se known manner, the carriage 26, the level-wind pawl 33 mounted on the carriage realizing the desired distribution of the line and criss-cross laying of the line coils on the line spool.

The guide tube 27 is supported at its ends on bearing sleeves 30 which consist, for example, of nylon and are mounted in the inner end walls 31 of the multiplier frame and in which the stub shafts of the involute screw 9 are journalled.

As opposed to conventional constructions in which the pawl mounted on the level-wind carriage 26 is in the form of a steel wire inverted U-member, the illustrated pawl 33 consists of a plate with an open guide groove 34 in which the line 35 normally runs during retrieval. As will be apparent from the following explanation, the level-wind pawl is arranged to be released from the line during cast and to pick up the line again when retrieval of the line is commenced. During retrieval of the line, the line is kept taught in that it runs, from the guide groove 34 of the level-wind pawl 33, to the line spool 1 under a transverse, round, smooth bar 36 (please see FIG. 5) which, at its ends, is connected to the multiplier frame end walls 31 and against which the line is caused to form a bend in the distance from the line spool to the level-wind pawl 33. In order to reduce the sliding friction of the line 35 against the bar 26, the bar is very smooth and hard chromium-plated.

The carriage 26, shiftably guided on the guide tube 27, is disposed to reciprocally rotate through a restricted angle in order to permit pivoting away of the level-wind pawl 33 from engagement with the line 35 during a cast and returning the pawl 33 on retrieval of the line. For this purpose, the carriage 26 could be pivotally disposed on the guide tube between pivot arrest stops, in which case a minor amount of friction between the coupling pin and the involute screw may be utilized for realizing the necessary torque for returning the carriage after it has been swung away during the cast (in which case the line and inertia forces are utilized for this swinging away movement). However, in the illustrated preferred embodiment, the guide tube 27 is arranged so as to be rotatable through a restricted angle reciprocally on the bearing sleeves 30 of the involute screw 9 (or preferably together with them) in which case the bearing sleeves are mounted rotatably in the reel frame. As a result, return of the carriage 26 to the operative position after a cast is effected by means of a minor friction moment between the carriage and the guide tube 27 and between the involute screw 9 and the left-hand bearing sleeve 30 in FIG. 1, by intermediary of a spring washer 37 placed under tension between the gear wheel 14 and the adjacent end of this bearing sleeve 30, and by means of the driving force on rotation of the crank for retrieval of the line.

It should, however, be noted that the level-wind mechanism for automatic release and recapture of the line is not dependent upon the special clutch 16 and that it may also be used without any release being realized between the line spool and the level-wind mechanism. In the latter case, the involute screw 9 is driven by the line spool also during cast and the friction will, during the cast, impart to the coupling pin a torque in a direction for swinging away of the carriage 26.

On rotation of the crank 2 for retrieval of the line (the line spool then rotating in the opposite direction to the direction of rotation during the cast) the carriage 26 and level-wind pawl 33 are consequently returned to the operative level-wind position. In order that the pawl 33 securely capture the line when the level-wind mechanism is driven by means of the crank after the completion of a cast, the bar 36 displays, at each end, a broadened end portion 36' which merges in the narrower cylindrical centre portion of the bar via a conical or other suitably shaped transition surface 36" (please see FIG. 5). If not before, the level-wind pawl 33 will, at either end position, securely capture the line because the line, as it is being retrieved, is moved by the pawl 33 via the transition surface 36" towards either end broadened portion 36' of the bar 36, whereafter the pawl 33, on being moved a slight further distance towards either end of the bar 36 before starting its return journey, will force the line to slide into the groove 34.

The possible angle of rotation of the carriage 26 and the guide tube 27 may be restricted by means of cooperating arrest stops between, for example, a projection (not shown), for example at the right-hand end of the guide tube 27 (with respect to FIG. 1) and the frame wall 39.

Instead of utilizing friction between the gear wheel 14 and the bearing sleeve 30 in accordance with the embodiment shown in FIG. 1, by the intermediary of the spring washer 37, it is conceivable to realize the necessary torque on the guide tube 27 for pivoting the carriage 26 by constructing the two intermediate gear wheels 11 and 12 as two separate gear wheels and by disposing the smaller gear wheel 12 such that it is rotatable between opposed abutments in a small angle with respect to the larger gear wheel 10 under a certain bearing friction between the two gear wheels. In such an event, the spring washer 37 may be dispensed with and the bearing body and guide tube may be non-rotatably connected to each other and to the frame. The friction between the involute screw and the coupling pin 29 will then give the necessary torque for returning the carriage 26. Moreover, the coupling pin 29 may possibly co-act with the slot edges of the guide tube for the purposes of providing limit positions for this pivoting movement.

The embodiment of FIG. 6 differs from that of FIG. 5 in that the release mechanism 16 has been replaced by a centrifugal clutch.

The gear drive 17, driven by the line spool 1 by the intermediary of the centrifugal clutch generally designated 40 (this drive corresponding to the gear drive 17 in the embodiment of FIG. 1) drives the involute screw 9 via the intermediate gear wheels 10, 11 and the gear wheel 15 fixedly mounted on the involute screw, when the line spool 1 is driven by the crank 2.

The centrifugal clutch 40 consists of a number of weights 41, for example two, which are actuated by centrifugal force. These weights are shiftably guided in a disk 43 connected to the line spool 1 or, where appropriate, with the rotatably journalled shaft 42 of the line spool. In the engaged position, the weights 41 abut in recesses 44 on a sleeve 45 integrally made with the gear drive 17. The sleeve 45 is journalled on an extension 42' of the spool shaft 42. The weights 41 are biased by means of springs 46 in a direction towards the above-mentioned engagement, that is to say in a radial inward direction. The springs 46 are placed under tension between abutments on the weights 41 and a surrounding wall 47. The device works in the following manner.

The centrifugal clutch 40 releases the gear drive 17 included in the level-wind mechanism, in that the weights 41 are shifted radially outwardly from engagement with the sleeve 45 when the spool, during cast, has reached a relatively high speed of rotation, whereby the sleeve 45 with the gear drive 17, as well as the gear wheel set 10, the gear wheel 14 and the level-wind 25, are completely released from the shaft 42 so that the pawl 33 stops. When the speed of rotation then falls below a certain, relatively low speed, the sleeve 45 and gears 17, 10 and 14 are reengaged, the level-wind pawl 33 being also reengaged and recommencing to guide the line for line-laying on the spool. When the level-wind is reengaged, a braking effect occurs which brakes the spool in the final phase of the cast, this counteracting line overrun on the spool.

The above-described embodiment of the centrifugal clutch 40 represents a preferred embodiment according to the invention but may be modified within the spirit and scope of the present invention as regards details. In the illustrated embodiment, the centrifugal weights 41 are in the form of cylindrical bodies whose radial inner ends may be conical in order easily to be returned to engagement in the recess in the gear wheel extension 45. Furthermore, the entire clutch means 40 may easily be dismounted. The gear drive 17 may, for example, easily be dismounted from the shaft 42 without the prior need of radially outwardly shifting the centrifugal weights 41. This is made possible in that the recesses 44 in the sleeve 45 are in the form of grooves which are open at the right-hand end of the sleeve 45 with respect to FIG. 1. The disk 43 may be in the form of a ring of plastics and, as for the simple bores such as the bores (or cast cylindrical cavities) 50, these may be replaced by cavities in sleeve-like inserts, for example of metal, in the annular disk 43. The annular disk 43 may be removably fixed to the spool end wall 1a or to a metal plate 51, connected to the spool end wall 1a, by means of a number of screws 52 of which only one is shown in FIG. 6. The spool shaft 42 may, as is shown in FIG. 6, be axially fixed in relation to the spool end wall or the plate 51 by means of a locking washer 53, whose peripheral edge need not be connected to the annular disk 43 but may serve as an assembly-facilitating centering edge for the disk 43.

It should also be noted that the wall 47, which is illustrated as a flange ring, may be replaced by other sealing members at the radial outer ends of the cavities for the centrifugal weights. If these cavities consist of sleeve-like inserts, they may be sealed at their outer ends.

The gear drive 17 and its sleeve-like extension 45 may be made integrally of plastics, and the intermediate gear wheels 11 and 12 and the gear wheel 14 may also consist of plastics. For axial fixation of the gear wheel 14, a locking washer 55 is disposed in a groove 56 in the shaft 42 between the bearing housing 57 and the gear drive 17.

It will be apparent from the above that the centrifugal clutch 40 according to the invention forms a very compact, easily dismountable unit which may be mounted in most types of multiplier reels after insignificant modifications.

In the use of the release mechanism according to the invention for the level-wind, the following advantages will be gained.

The level-wind is automatically opened forwardly during the cast, the line being completely released. Moreover, the entire level-wind system is released by release of the gear drive 17 on the spool shaft 5.

On retrieval of the line, the level-wind is pivoted back into position and captures the line in one of its extreme positions. The gear ratio of the level-wind may be somewhat higher than normal in order to capture the line as rapidly as possible and thereby lay the line evenly on the spool.

The multiplier may have a fixed spool shaft 5 and a lathe-turned, ball bearing-mounted spool 1, whereby the weight of the spool can be reduced a not inconsiderable degree. This entails that the start surge is reduced in the cast, whereby the casting properties of the reel will be improved.

A further advantage is that the line on the spool will be more easily accessible, for example for unravelling the line on the line spool after a birdsnest, in that the line may be moved away from the level-wind.

The level-wind system may also be used in conventional spool shaft systems in which the line spool is connected to the spool shaft and the spool shaft is journalled in bearings in the frame.

In utilization of the release device according to the invention in multiplier reels with a conventional level-wind mechanism, it may happen in certain cases that the level-wind, at the termination of a cast, stops at one extreme position of the involute screw and that the line, when it is unwound at the opposite end of the line spool with respect to the stop position of the level-wind will thereby display a relatively sharp bend from the level-wind to the line spool. This can cause a braking effect, although this may be neglected in multiplier reels of normal spool width.

However, in multiplier reels with larger spool width (greater shaft length) the line angle from the level-wind to the spool can, in unfavourable circumstances, be so great that the deviation force from the line causes a braking effect of undesirable proportions. This inconvenience is obviated by the use of the above-described device for release of the level-wind from the line during a cast. The release mechanism for the level-wind can then be used irrespective of the width of the spool, since the line, having been released from the level-wind, will not be subjected to any deflection during the cast.

The centrifugal clutch 40 in FIGS. 6 and 7 gives the following particular advantages:

(1) The line spool is released during a cast, so that it, together with its shaft, rotates completely free of other rotary parts (it should, however, be observed that the clutch mechanism 40 may also be used in multipliers in which the shaft, such as the shaft 5 in FIG. 1, is fixedly retained and the spool 1 is rotatably mounted on the shaft);

(2) Application of the mechanical brake with which multipliers are as a rule equipped, may be reduced because of the fact that the level-wind mechanism and its transmission are reengaged and exercise a braking effect in the final phase of the cast;

(3) When the multiplier is used for so-called jigging, the level-wind functions as in conventional multipliers, since the rotation speed in this type of fishing is so low that release does not occur;

(4) The centrifugal clutch 40 can also be used in the majority of multipliers without any appreciable constructional modifications, and may be used in association with conventional, generally well-functioning level-wind mechanisms., FIGS. 1 and 6 are examples showing that the release mechanism according to the invention is applicable both to multipliers with the line spool rotatably journalled on a fixed spool shaft (FIG. 1) and to multipliers with the line spool fixedly connected to a shaft rotatably journalled in the reel frame (FIG. 5). It should also be noted that it is possible, after minor modifications, to use the one-way clutch in FIG. 1 in a multiplier of the type illustrated in FIG. 6, and to use the centrifugal clutch of FIG. 6 in a multiplier of the type shown in FIG. 1.

The above-described embodiments of the multiplier according to the invention may, naturally, be modified in various ways without departing from the spirit and scope of the appended claims for adaptation to different types of multipliers and for special needs.

What I claim and desire to secure by Letters Patent is:

1. A multiplier fishing reel comprising a frame; a line spool rotatably supported by said frame; a hand crank and a first transmission between said hand crank and said line spool for rotating the latter by means of said hand crank for the retrieval of a fishing line on said line spool; a level wind mechanism including an evolute screw member having an endless thread and mounted rotatably in said frame, a second transmission connected between said line spool and said screw member for rotating the latter by means of said hand crank via said first transmission and said line spool, a tubular guide member which partly encompasses said screw member and is rotatably mounted in said frame for rotational movement about the longitudinal axis of said screw member, a slide member which is mounted on said tubular guide member for sliding movement therealong and to be rotated therewith, said slide member having means in engagement with said endless thread of said screw member to be driven by the latter in a reciprocal movement along said tubular guide member when said screw member is rotated, a level-wind arm supported by said slide member and having an outer end with means forming an open fishing line catching and guiding groove; said slide member being pivotable about the longitudinal axis of said screw member by rotation of said guide member for pivoting said arm between first and second angular positions, said first position being a normal operating position for catching the line into said groove and for levelling the line on said line spool when the latter is rotated by said hand crank for retrieval of the line on said spool, and said second angular position being an inoperative position in which the fishing line is permitted to go free from said arm for easy running out from said line spool during casting, stop position determining means defining stop positions in opposite angular directions for said arm in said first and second angular positions thereof, and returning means connected between said second transmission means and said guide member for rotating the latter in one direction for returning said slide member with said arm from said second to said first angular position when said screw member is rotated by means of said hand crank in a direction for the retrieval of the line on said spool, said returning means being a frictionally acting coupling means which comprises first and second cooperating frictional clutch members, said first frictional coupling member being rotatable by said second transmission from said hand crank via said first transmission and said line spool when said first clutch means is engaged, said second frictional clutch member being connected to said rotatable guide member and positioned in sliding frictional engagement with said first frictional clutch member, said frictional clutch members being able to slip in relation to each other after rotating said guide member a sufficient angle to return said arm to said first position, which is a stop position, and said slide member with said arm being adapted to be pivoted to said second position automatically when said first clutch means is disengaged and a cast is initiated, said frame including opposite frame members having coaxial openings and bearings therein, said screw member having opposite ends journalled in said bearings, said bearings having means which project into opposite ends of said tubular guide member and forming supporting means for the latter in relation to said frame, a gear wheel which forms part of said second transmission supported on one end of said screw member in a position outwardly of the corresponding one of said bearings, a spring washer mounted between and in sliding frictional engagement with one end of said gear wheel and the adjacent end of said corresponding one of said bearings for transmitting drive torque from said gear wheel to said guide member through said corresponding one of said bearings.

* * * * *